United States Patent [19]

Hilts

[11] Patent Number: 4,545,101

[45] Date of Patent: Oct. 8, 1985

[54] METHOD FOR PREVENTING CYLINDER HEAD WARPAGE, AND OVER-HEATING OF INTERNAL COMBUSTION ENGINES

[76] Inventor: John R. Hilts, Box 413, Cheney, Kans. 67025

[21] Appl. No.: 575,794

[22] Filed: Feb. 1, 1984

[51] Int. Cl.[4] .............................................. B23P 15/00

[52] U.S. Cl. .............................. 29/156.4 R; 29/401.1; 29/402.06; 29/402.07; 29/402.09; 29/426.1; 29/DIG. 26; 123/52 M; 123/52 MC; 123/193 H

[58] Field of Search ...................... 29/156.4 R, 401.01, 29/402.03, 402.04, 402.05, 402.06, 402.07, 402.09, 426.1, DIG. 26; 123/193 H, 52 M, 52 MC

[56] References Cited

U.S. PATENT DOCUMENTS

| | | | |
|---|---|---|---|
| 2,944,336 | 7/1960 | Stancliff et al. | 29/156.4 R X |
| 3,066,400 | 12/1962 | Forsythe | 29/156.4 R X |
| 3,187,729 | 6/1965 | Morrison | 123/193 H |
| 4,034,723 | 7/1977 | Hamparian | 123/193 H X |
| 4,232,437 | 11/1980 | Fair | 29/156.4 R |

FOREIGN PATENT DOCUMENTS

| | | | |
|---|---|---|---|
| 309142 | 9/1971 | U.S.S.R. | 123/52 MC |

*Primary Examiner*—Mark Rosenbaum

*Assistant Examiner*—Ronald S. Wallace

*Attorney, Agent, or Firm*—Phillip A. Rein

[57] ABSTRACT

This invention relates to a method and structure of preventing cylinder head warpage and over-heating of internal combustion engines by utilizing a cylinder head modification assembly. The cylinder head modification assembly includes (1) a main expansion transfer plate assembly; and (2) an exhaust port expansion transfer assembly, each of which are adapted to be mounted on a cylinder head structure to provide strengthening and expansion transfer characteristics. The main expansion transfer plate assembly is of an elongated rectangular shape having various portions of different heights in order to achieve the required strength and heat transfer properties. The exhaust port expansion transfer assembly includes a main support body having an integral anchor section and is adapted to be mounted and secured between adjacent exhaust ports of the cylinder head structure. These elements are attached to the existing cylinder head structure after slight modification thereof so as to distribute excessive expansion build up and warpage during usage. The method of this invention involves the steps of preventing cylinder head warpage and over-heating by a machining process and application of the cylinder head modification assembly to a cylinder head structure.

7 Claims, 10 Drawing Figures

Fig. 1
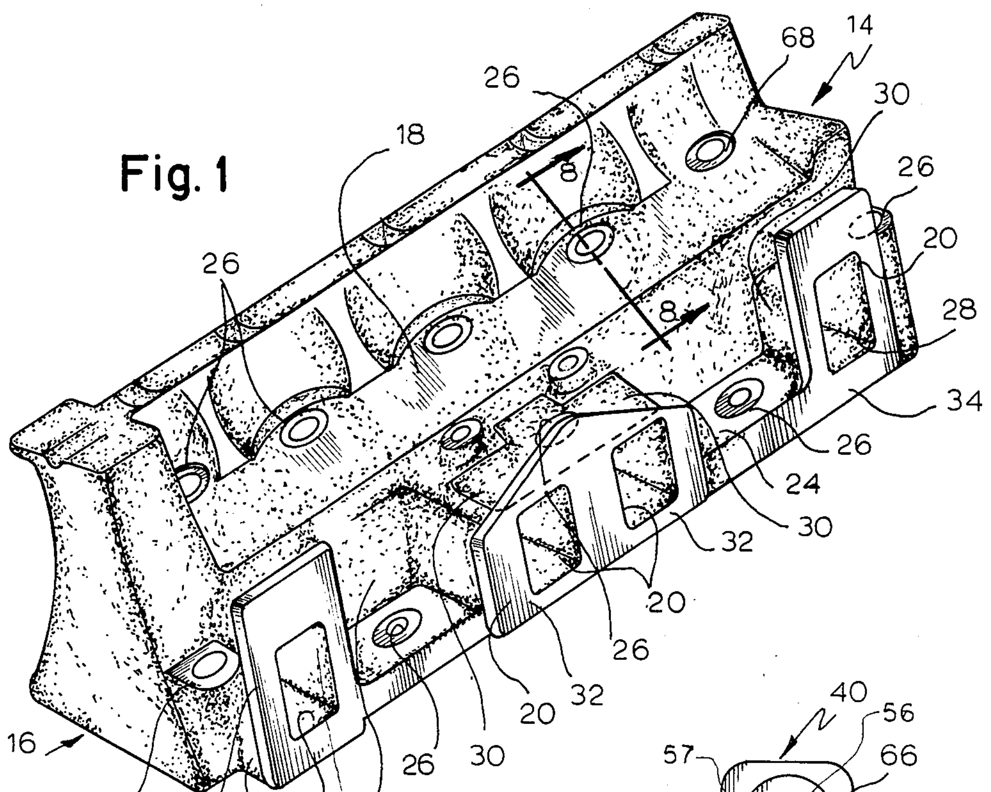
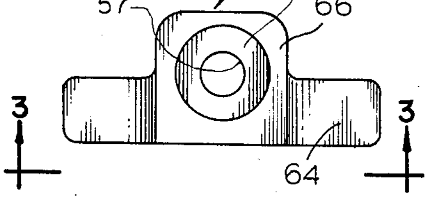
Fig. 2
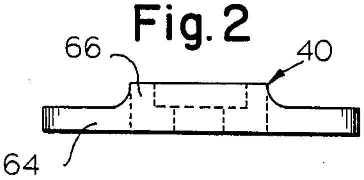
Fig. 3
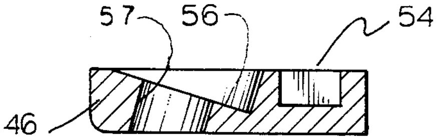
Fig. 5
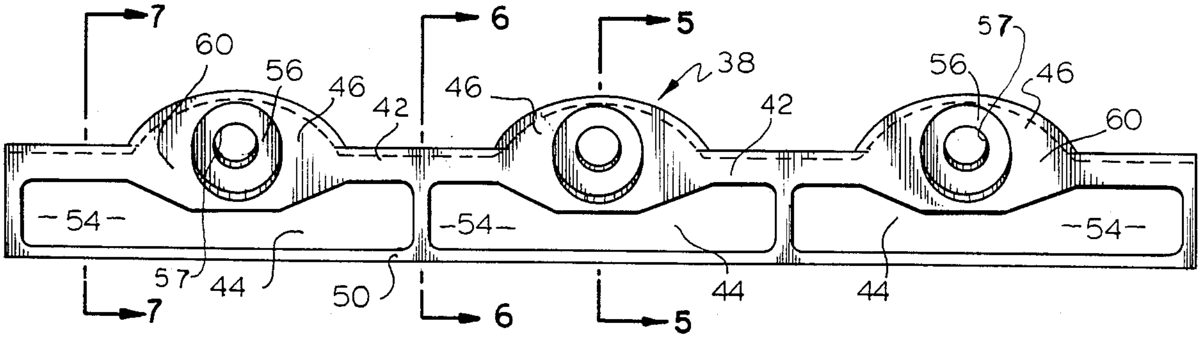
Fig. 4

METHOD FOR PREVENTING CYLINDER HEAD WARPAGE, AND OVER-HEATING OF INTERNAL COMBUSTION ENGINES

PRIOR ART

The following U.S. patents are noted which appear to be relevant to our invention as set forth herein. The patents are as follows:

U.S. Pat. No. 2,361,106
U.S. Pat. No. 2,944,336
U.S. Pat. No. 3,593,406
U.S. Pat. No. 3,675,309

The Jensen patent discloses a method of repairing and for preventing cracks in metal castings, but is not related to the problem of preventing cylinder head warpage.

The Stancliff et al patent is pertinent in relating to method of preventing thermal damage in combustion region wall structures of internal combustion engines similar to the purpose of the applicant's invention. The Stancliff et al patent attempts to solve the similar problems as the applicant's invention herein which does not use the specific method and parts of our invention.

PREFERRED EMBODIMENT OF THE INVENTION

In one preferred embodiment of the method and structure of preventing cylinder head warpage and over-heating of internal combustion engines, the invention is divided into a structural portion being a cylinder head modification assembly and a method or process portion being the method of preventing cylinder head warpage and over-heating.

The cylinder head modification assembly consists of (1) a main expansion transfer plate assembly; and (2) an exhaust port expansion transfer assembly, each adapted to be mounted on a cylinder head structure of a water cooled internal combustion engine in order to add support thereto and aid in the transfer of expansion caused by excessive heat. The main expansion transfer plate assembly is of an elongated rectangular shape having various portions of different heights to achieve the strength and heat transfer characteristics. More particularly, the main expansion transfer plate assembly includes a main support body section; a heat transfer section; and a plurality of connector sections adapted to receive bolt members therethrough for mounting against the cylinder head structure. The exhaust port expansion transfer assembly includes a main support body having an integral anchor section. The anchor section is adapted to receive bolt members therethrough for mounting against the cylinder head structure. The main support body is adapted to add support and expansion transfer characteristics to an area adjacent to a pair of engine exhaust ports which creates a very high temperature in this area. The cylinder head modification assembly is operable to provide the necessary support to the cylinder head structure to prevent warpage and, additionally, to provide an increased surface area to aid in the transfer of expansion from localized overheating areas of the cylinder head structure. The method of preventing the cylinder head warpage and over-heating includes the steps of (1) filling connector hole sections on existing cylinder head structures with a hard epoxy or welding material; (2) machining and smoothing the filled areas of the connector hole sections so as to be level with the surrounding area; (3) applying the cylinder head modification assembly of this invention to the existing cylinder head structure; (4) securing as by a plurality of bolt members the combination of the cylinder head modification assembly and the cylinder head structure to the engine block member of the internal combustion engine; and (5) torqueing the bolt members at a constant predetermined torque so as to properly hold the cylinder head modification assembly against the cylinder head structure; and (6) transferring expansion due to localized hot spot downwardly and outwardly towards either end of the cylinder head structure so as to prevent warpage and overheating thereof.

OBJECTS OF THE INVENTION

One object of this invention is to provide a cylinder head modification assembly which can be secured to new or existing cylinder head structures of internal combustion engines to prevent warpage thereof by aiding in the transfer of expansion therethrough.

One further object of this invention is to provide a cylinder head modification assembly which can be readily attached to new or existing cylinder head structures in a fast, simple manner not requiring special fixtures or tools to do so.

One other object of this invention is to provide a cylinder head modification assembly to be attached to cylinder head structures which is easy to manufacture, simple to install, sturdy in construction, and maintenance free.

Still, one further object of this invention is to provide a method of preventing cylinder head warpage and over-heating involving easy steps with a minimal amount of skill and tools required.

Still, another object of this invention is to provide a method of preventing cylinder head warpage and overheating which is easy to follow; simple in operation; and achieving the end result of the transfer of expansion and prevention of warpage in an economical manner.

Various other objects, advantages, and features of the invention will become apparent to those skilled in the art from the following discussion, taken in conjunction with the accompanying drawings in which:

FIGURES OF THE INVENTION

FIG. 1 is perspective view of a cylinder head structure to which the method and structure of the invention herein is to be utilized thereon;

FIG. 2 is a top plan view of an exhaust port expansion transfer assembly of a cylinder head modification assembly of this invention;

FIG. 3 is a side elevational view taken along line 3—3 in FIG. 2;

FIG. 4 is a top plan view of a main expansion transfer plate assembly of the cylinder head modification assembly of this invention;

FIG. 5 is an enlarged sectional view taken along line 5—5 in FIG. 4;

Figure 9:
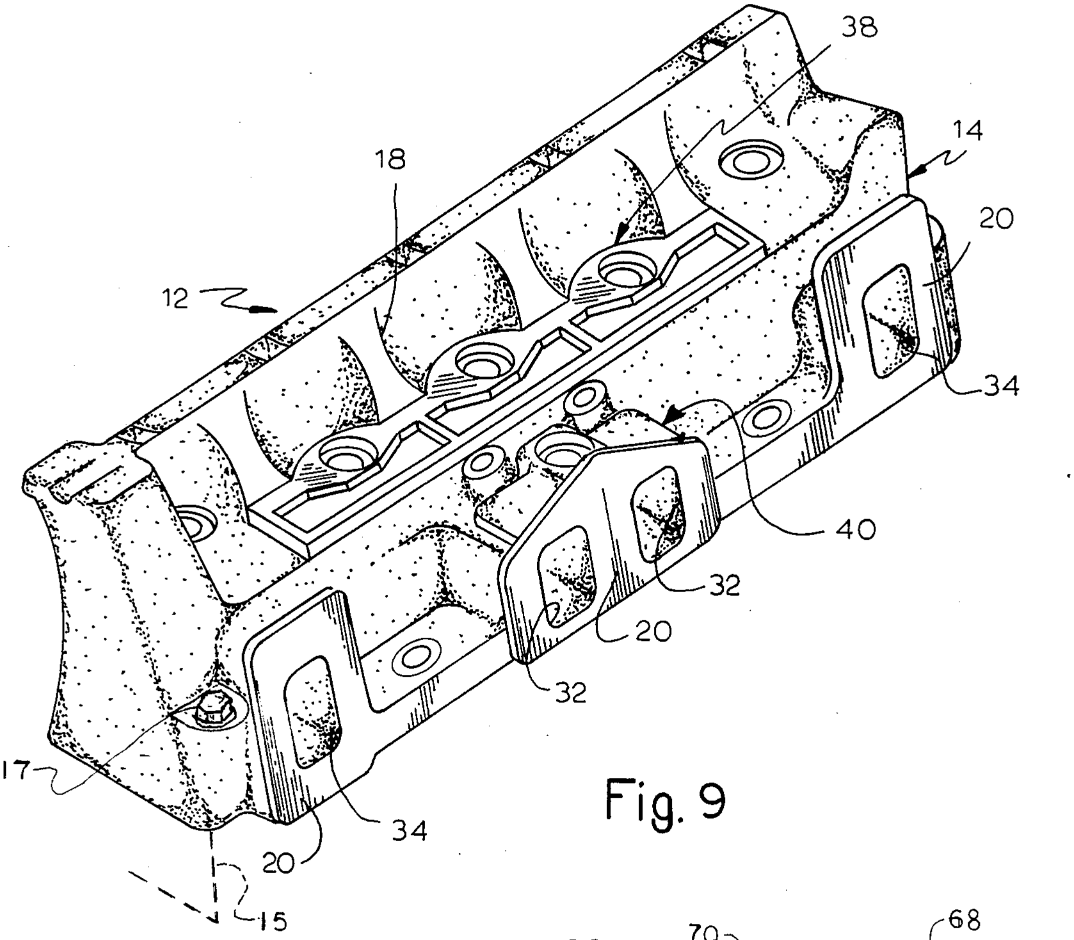
FIG. 9 is a perspective view of a cylinder head structure having the cylinder head modification assembly and method of this invention as applied thereto.
Figure 6:
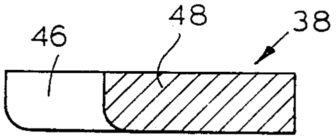
FIG. 6 is an enlarged sectional view taken along line 6—6 in FIG. 4.
Figure 7:
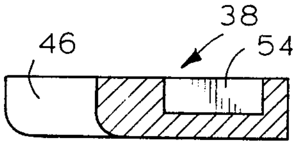
FIG. 7 is an enlarged sectional view taken along line 7—7 in FIG. 4.

The following is a discussion and description of preferred specific embodiments of the method and structure of preventing cylinder head warpage and over-heating of internal combustion engines of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, this invention is related to a method and structure of preventing cylinder head warpage and over-heating of internal combustion engines and is divided into the invention being a structure of (1) a cylinder head modification assembly 12; and (2) a method of preventing cylinder head warpage caused by localized over-heating. This invention is to be applied to a cylinder head structure 14 which is part of an internal combustion engine which channels the exhaust gases from the combustion chambers and, perhaps due to deflector design, creates excessive localized heat and resultant cylinder head structure warpage.

This invention can be applied to any internal combustion engine having similar adjacent exhaust ports and excessive heat problems. A specific example of this problem is in an automobile known as the "Triumph Stag" which was powered with a V-8 engine in approximately 1971-1972. From 1975 to 1980, the manufacturer sold a "Triumph TR7" which was powered by a four-cylinder engine. The problems with the four-cylinder engine as noted herein is that the exhaust ports, especially the inner ones, are adjacent to each other and therefore create excessive heat problems. More specifically, is that the cylinder head structure becomes loose from the engine block due to the excessive heat causing leakage of oil and coolant past a cylinder head gasket. Eventually, this allows the coolant level to become low enough to cause extreme overheating conditions in the cylinder head structure thus allowing the same to warp. This occurs easily because the cylinder head structure is constructed of an aluminum material. This over-heating and warpage is mainly caused due to a faulty cylinder head design in that the exhaust valves for the center two cylinders are placed adjacent to each other. This localized over-heating results in expansion and causes a compression of the softer aluminum material around the standard size steel washer and mounting bolts as a cylinder head temperature increases. Thus, when the engine is cooled, there is a gap between the steel washer and the cylinder head structure thus leaving the mounting bolts loose which now causes a gap and allows for the leakage of coolant fluid and oil therefrom. Therefore, the object of the cylinder head modification assembly 12 and the method of preventing cylinder head warpage and over-heating of this invention is to overcome the aforementioned problems in these particular engines and others which are similarly faulty cylinder head structure designs.

As shown in FIG. 9, a cylinder head modification assembly 12 of this invention is shown as applied to a cylinder head structure 14 of an internal combustion engine block 15 and secured thereto in a conventional manner by a plurality of washers and bolt members 17.

On referring to FIG. 1 as showing a substantially conventional cylinder head structure 14 which is secured to an engine block structure, the cylinder head has many ports therein to transfer the exhaust gases outwardly into a manifold assembly and then to a muffler structure (not shown). The cylinder head structure 14 includes a main head body 16 of generally irregular shape.

The main head body 16 is provided with an upper connector section 18; an exhaust gas section 20; an intermediate connector section 22; and a lower connector section 24. The upper connector section 18 includes a plurality of connector holes 26 adapted to receive the bolt and washer members 17 therethrough for anchoring the same to the engine block 15.

The exhaust gas section 20 includes a plurality of exhaust ports 28 which receive exhaust gases from exhaust channels 30. The exhaust channels 30 are divided into inner channel sections 32 and outer channel sections 34. It is noted that the inner channel sections 32 are closely adjacent to each other which creates a localized excessive heat area and thus "warpage and over-heating problems" which this invention intends to overcome. The intermediate connector section 22 is provided with a plurality, namely three, connector holes 26 which are adapted to receive connector bolt and washer members 17 for attachment to the engine block 15.

The lower connector section 24 is provided with a couple of connector holes 26 adapted to receive bolt and washer members 17 therein for further rigid connection to the engine block 15.

The cylinder head modification assembly 12 consists of two major elements being (1) a main expansion transfer plate assembly 38; and (2) an exhaust port expansion transfer assembly 40. The main expansion transfer plate assembly 38 includes a main support body section 42; a heat transfer section 44 integral with the main support body section 42; and connector sections 46 integral with the main support body section 42 and the heat transfer section 44. The main support body section 42 includes a connector support section 48 integral with an outer support portion 50.

The heat transfer section 44 consists of three (3) inner heat transfer portions 54, each surrounded by a portion of the main support body section 42.

The plurality of connector sections 46 are each substantially identical being of oval shape having a connector hole portion 56 centrally of a connector support portion 60. Each connector hole portion 56 is provided with a central hole 57.

It is noted that the heat transfer section 44 is substantially half or less than half the thickness of the connector sections 46 and the main support body section 42 so as to allow rapid heat transfer therethrough and aid in cooling of the main expansion transfer assembly 38.

The exhaust port expansion transfer assembly 40 is provided with a main support body 64 of irregular shape integral with an anchor section 66. The anchor section 66 is substantially twice the thickness of the main support body 64 to provide rigidity thereto while the main support body 64 provides a larger than standard surface area to transfer expansion of the cylinder head structure. The anchor section 66 is provided with a central connector hole portion 56 having a central hole 57.

Figure 8:
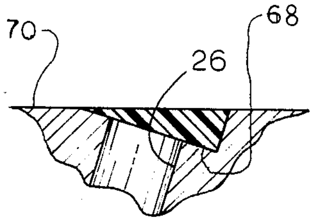
FIG. 8 is an enlarged fragmentary sectional view taken along line 8—8 in FIG. 1.

The method of preventing cylinder head warpage and over-heating of this invention involves a slight modification of the cylinder head structure 14 shown in FIG. 1 and, additionally, applying the cylinder head modification assembly 12 of this invention thereto. The first step involved is taking the upper connector section 18 and the holes 26 as shown in FIG. 1 and modifying by filling an inclined upper connector portion 68 with a epoxy or welding material as illustrated in FIG. 8. After filling the subject connector holes 26, the area is machined so as to present an upper flat surface indicated at 70 so as to provide a continuous support to the expansion transfer plate assembly 38 to be mounted thereon in a manner to be explained.

Next, the main expansion transfer plate assembly 38 is placed on the upper surface adjacent the connector holes 26 on the upper connector section 18 as shown in FIG. 9. Next, a plurality of the bolt and washer members 17, namely three, are inserted through the respective connector hole portions 56 and central holes 57 of the connector sections 46 of the main expansion transfer assembly 38 for securing same against the cylinder head structure 14 and to an engine block member 15.

The next step is to apply the exhaust port expansion transfer assembly 40 to the intermediate connector section 22 of the main head body 16 which is shown as on top of the inner channel sections 32 of the exhaust channels 30. It is obvious that this area, with the two adjacent exhaust channels 30, creates an excessive heat problem in this area which leads to the warpage of the aluminum cylinder head structure 14. Next, a bolt and washer member 17 is inserted through the connector hole portion 56 and central hole 57 of the anchor section 66 of the exhaust port expansion transfer assembly 40 and to an engine block member 15.

Next, the subject bolt and washer members 17 inserted into the respective main expansion transfer plate assembly 38 and the exhaust port expansion transfer assembly 40 are tightened through the use of a torque wrench to get an even torquing pressure thereon being ideally 55 lbs. per square inch. The torque pressure can be varied plus or minus 5 lbs. per square inch. This is important so that the main expansion transfer plate assembly 38 and the exhaust port expansion transfer assembly 40 are evenly torqued downwardly and provide a full contact of the undersurfaces thereof with the respective connecting areas on the cylinder head structure 14.

With this achieved, it is noted that the cylinder head modification assembly 12 acts to (1) provide a greatly increased contact area on the upper surfaces of the cylinder head structure 14 to control expansion downwardly and outwardly to either end preventing warpage thereof; and (2) the use of the cylinder head modification assembly 12 by being preferably constructed of a high strength steel, it will not bend or warp at the connection of the bolt and washer members as happens with the contact thereof directly with an aluminum cylinder head structure 14. Thus the cylinder head modification assembly keeps the cylinder head from flexing due to power stroke forces of the engine which increases performances and eliminates cylinder wall deformation which could cause oil consumption due to excessive crankcase pressures.

USE AND OPERATION OF THE INVENTION

In the use and operation of the invention, it is noted that the cylinder head structure 14 as illustrated in FIG. 1 is first to be modified by filling the connector holes 26 on the upper connector section 18 as by an epoxy or welding material as shown in FIG. 8. The upper surface 70 thereof is then machined to be completely horizontal in the same plane as the surrounding material.

Next, the elements of the cylinder head modification assembly 12 being the main expansion transfer plate assembly 38 and the exhaust port expansion transfer assembly 40 are placed upon the respective upper surfaces of the cylinder head structure 14 as shown in FIG. 9. The rearward curvature of the back edge of the main expansion transfer plate assembly 38 has been machined to fit into similarly shaped areas of the cylinder head structure 14. Next, bolt and washer members 17 are placed within the respective connector hole portions 56 and central holes 57 of the main expansion transfer plate assembly 38 and the exhaust port expansion transfer assembly 40 of the cylinder head modification assembly 12.

The bolt members 17 are torqued to a predetermined desired pressure, preferably 55 lbs. per square inch, so as to anchor the inter-connected cylinder head modification assembly 12 and cylinder head structure 14 to the engine block 15.

Figure 10:
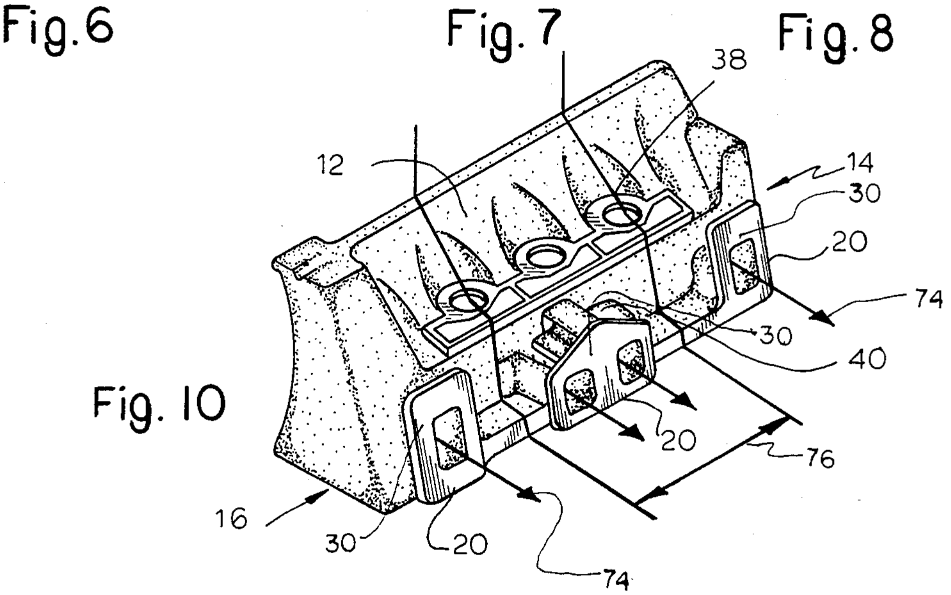
FIG. 10 is a skematic diagram illustrating the expansion transfer and strengthening characteristics of this invention.

It is noted in the skematic diagram of FIG. 10 and as indicated by arrows 74, it is seen that the exhaust gases are to be fed outwardly through the exhaust channels 30 into a manifold structure and then to a muffle pipe system to exhaust the heat from the internal combustion engine. It is noted that the inner channel sections 32 are adjacent to each other, and therefore, achieve an excessive heating area indicated by an arrow 76 in the cylinder head structure 14 as shown in FIG. 10. This excessive heat is transfered to the cylinder head modification assembly 12 as a form of expansion forces which are reversed downwardly and outwardly to either end of the cylinder head structure 14 to keep the same from becoming warped.

Also, the enlarged connector areas with the connector sections 46 of the main expansion transfer plate assembly 38 provides substantial rigidity to this overheated area to prevent the same from becoming warped and the bolt and washer members 17 from becoming loose.

The method of preventing cylinder head warpage and over-heating of this invention involves the steps of;

(1) filling of certain connector holes sections on the original cylinder head structure 14 with an epoxy or welding material;

(2) machining the area about the above filled connector hole sections on the cylinder head structure 14 so the same lies in a common horizontal plane with adjacent area;

(3) applying the expansion transfer plate assembly 38 to the cylinder head structure 14; and/or (4) applying the exhaust port expansion transfer assembly 40 to the cylinder head structure 14;

(5) inserting bolt members 17 through the respective central connector holes in the main expansion transfer plate assembly 38 and the exhaust port expansion transfer assembly 40;

(6) torquing the inserted bolt members 17 to a desired pressure such as 55 lbs. per square inch plus or minus 5 lbs.; and (7) transfering excessive expansion build-up within the cylinder head structure 14 downwardly and outwardly toward either end through the cylinder head structure 14.

It is seen that the method and structure of preventing cylinder head warpage and over-heating of an internal combustion engine as set forth in this specification is operable to achieve the desired end result with the minimal amount of machine effort, special tools, and additional parts to be added thereto.

The main expansion transfer plate assembly is of a unique and unusual design of various thickness so as to achieve the expansion transfer and strengthening characteristics with a minimum amount of expense and skilled labor required. Additionally, the exhaust port expansion transfer assembly is operable to provide the necessary strength and expansion transfer characteristics at the area of exhaust channels which are placed adjacent to each other.

This invention achieves the method of preventing damage to a cylinder head structures which is economical to achieve; reliable in operation; easy to install; and substantially maintenance free.

While the invention has been described in conjunction with preferred specific embodiments thereof, it will be understood that this description is intended to illustrate and not to limit the scope of the invention, which is defined by the following claims.

I claim:

1. A method of preventing cylinder head warpage and over-heating of internal combustion engines, comprising:

(a) removing anchor bolt members that are holding a cylinder head structure against a cylinder block structure;

(b) applying an expansion transfer plate assembly to an area above the exhaust ports on said cylinder head structure;

(c) inserting bolt members through holes in said main expansion transfer plate assembly so as to anchor same against said cylinder head structure and to said engine block structure; and (d) torquing said bolt members to an even desired pressure to clamp said expansion transfer plate assembly against said cylinder head structure;

whereby said expansion transfer plate assembly applies a large surface area to an upper surface of say cylinder head structure to control expansion and to prevent warpage thereof.

2. A method of preventing warping and over-heating of cylinder head structures as described in claim 1, including:

(a) applying an exhaust port expansion transfer assembly to an intermediate surface of said cylinder head structure;

(b) inserting a bolt member through a hole in said exhaust port expansion transfer assembly to anchor same firmly against said cylinder head structure;

whereby said exhaust port expansion transfer assembly adds increased surface area to a portion of said cylinder head structure which transfers expansion therefrom to prevent warpage thereof.

3. A method of preventing warping and over-heating of cylinder head structures as described in claim 1, including:

(a) filling of connector hole sections in said cylinder head structures with a rigid material; and (b) machining the areas of the filled holes so as to make the same in a common horizontal plane with adjacent areas.

4. A method of preventing cylinder head warpage and over-heating of internal combustion engines, comprising:

(a) removing anchor bolt members from connector holes in an upper connector section that are holding a cylinder head structure against a cylinder block structure;

(b) filling said connector holes with a rigid material;

(c) machining the area of said connector holes and said upper connector section to present same in a common plane;

(d) applying an expansion transfer plate assembly having a large surface area to said upper connector section; and (e) securing said expansion transfer plate assembly against said upper connector section;

whereby said expansion transfer plate assembly transfers heat from said cylinder head structure at said upper connector section to control expansion and prevent warpage of said cylinder head structure.

5. A method of preventing warpage and over-heating of cylinder head structure as described in claim 4, including:

(a) applying an exhaust port expansion transfer assembly to an intermediate connector section above exhaust channels on said cylinder head structure; and (b) securing said exhaust port expansion transfer assembly against said intermediate connector section;

whereby said exhaust port expansion transfer assembly transfers heat from said intermediate connector section to control expansion and prevent warpage of said cylinder head structure.

6. A method of preventing warpage and over-heating of cylinder head structures as described in claim 4, including:

(a) torquing said expansion transfer assembly and said exhaust port expansion transfer assembly against said cylinder head structure to a pressure recommended by the subject engine manufacturer for torquing said cylinder head structure.

7. A method of preventing cylinder head warpage and over-heating of internal combustion engines, comprising:

(a) applying an exhaust port expansion transfer assembly to an intermediate connector section above exhaust channels on said cylinder head structure; and (b) securing said exhaust port expansion transfer assembly against said intermediate connector section;

whereby said exhaust port expansion transfer assembly transfers heat from said intermediate connector section to control expansion and prevent warpage of said cylinder head structure.

* * * * *